United States Patent
Son et al.

(10) Patent No.: US 8,936,880 B2
(45) Date of Patent: Jan. 20, 2015

(54) CYLINDRICAL LITHIUM SECONDARY BATTERY WITH PRESSURE ACTIVATED CURRENT INTERRUPTIVE DEVICE

(75) Inventors: Mi-Young Son, Daejeon (KR); Jeong-Ju Cho, Daejeon (KR); Ho-Chun Lee, Daejeon (KR); Jong-Ho Jeon, Daejeon (KR)

(73) Assignee: LG Chem, Ltd., Seoul (KR)

( * ) Notice: Subject to any disclaimer, the term of this patent is extended or adjusted under 35 U.S.C. 154(b) by 376 days.

(21) Appl. No.: 13/001,811

(22) PCT Filed: Feb. 12, 2009

(86) PCT No.: PCT/KR2009/000646
§ 371 (c)(1),
(2), (4) Date: Mar. 18, 2011

(87) PCT Pub. No.: WO2010/002089
PCT Pub. Date: Jan. 7, 2010

(65) Prior Publication Data
US 2011/0183161 A1    Jul. 28, 2011

(30) Foreign Application Priority Data
Jun. 30, 2008 (KR) .................... 10-2008-0062688

(51) Int. Cl.
*H01M 6/16* (2006.01)
*H01M 2/34* (2006.01)
*H01M 10/052* (2010.01)
*H01M 10/0587* (2010.01)
*H01M 10/42* (2006.01)

(52) U.S. Cl.
CPC ........... *H01M 2/34* (2013.01); *H01M 2/345* (2013.01); *H01M 10/052* (2013.01); *H01M 10/0587* (2013.01); *H01M 10/425* (2013.01); *Y02E 60/122* (2013.01); *Y02T 10/7011* (2013.01); *H01M 2200/20* (2013.01)
USPC .............. 429/324; 429/53; 429/56; 429/331; 429/332

(58) Field of Classification Search
USPC ............................. 429/53, 56, 324, 331, 332
See application file for complete search history.

(56) References Cited

U.S. PATENT DOCUMENTS 5,256,504 A * 10/1993 Okuno et al. ............... 429/332
5,741,606 A *  4/1998 Mayer et al. ................ 429/53
(Continued)

FOREIGN PATENT DOCUMENTS

CN    1107352 C    4/2003
CN    1848510 A    10/2006
(Continued)

OTHER PUBLICATIONS

International Search Report for PCT/KR2009/000646, dated Sep. 11, 2009.

*Primary Examiner* — Zachary Best
(74) *Attorney, Agent, or Firm* — Birch, Stewart, Kolasch & Birch, LLP

(57) ABSTRACT

A cylindrical lithium secondary battery includes an anode and a cathode, capable of occluding or emitting lithium ions; a non-aqueous electrolyte; and a CID (Current Interrupt Device) for intercepting electric current and lowering inner pressure when the inner pressure of the secondary battery is increased. The cylindrical lithium secondary battery may ensure the safety of the battery with respect to overcharging and also at the same time prevent the problem wherein the CID is activated too early, such that the battery stops its operation when the battery is used in a high-temperature environment.

16 Claims, 2 Drawing Sheets

(56) References Cited

U.S. PATENT DOCUMENTS

| | | | |
|---|---|---|---|
| 6,265,097 | B1 | 7/2001 | Konno et al. |
| 6,346,344 | B1 | 2/2002 | Song et al. |
| 2006/0154116 | A1 | 7/2006 | Siret et al. |
| 2007/0212595 | A1 | 9/2007 | Kim et al. |
| 2008/0182159 | A1 | 7/2008 | Mitani et al. |
| 2012/0177956 | A1 | 7/2012 | Im et al. |

FOREIGN PATENT DOCUMENTS

| | | | |
|---|---|---|---|
| CN | 1976111 A | | 6/2007 |
| EP | 0 531 617 A1 | | 3/1993 |
| JP | 5-74489 A | | 3/1993 |
| JP | 5-74490 A | | 3/1993 |
| JP | 05074489 A | * | 3/1993 |
| JP | 07-320777 | | 12/1995 |
| JP | 09-213366 | | 8/1997 |
| JP | 2000-048801 | | 2/2000 |
| JP | 3029271 B | * | 4/2000 |
| JP | 2005-285565 A | | 10/2005 |
| JP | 2007-504628 A | | 3/2007 |
| JP | 2008-130482 A | | 6/2008 |
| JP | 2008-140760 A | | 6/2008 |
| KR | 10-2007-0093171 A | | 9/2007 |
| KR | 10-2008-0058967 A | | 6/2008 |
| WO | WO 2007/030816 A2 | | 3/2007 |

* cited by examiner (a)

(b)

(c)

(a)

(b)

CYLINDRICAL LITHIUM SECONDARY BATTERY WITH PRESSURE ACTIVATED CURRENT INTERRUPTIVE DEVICE

TECHNICAL FIELD

The present invention relates to a cylindrical lithium secondary battery, and more particularly to a cylindrical secondary battery having a CID (Current Interrupt Device), which interrupts electric current to lower inner pressure when inner pressure is increased.

BACKGROUND ART

Recently, interest in energy storage technologies have increased. As the energy storage technologies are extended to such devices as cellular phones, camcorders and notebook PCs, and further to electric vehicles, the demand for a high energy density battery used as a power source of such an electronic device has increased. A lithium ion secondary battery is one of the most satisfactory batteries, and numerous studies towards improvements are now in progress actively.

A lithium secondary battery may be made in various shapes. Representative examples include an angled lithium secondary battery, a cylindrical lithium secondary battery and a pouch-type lithium secondary battery.

As is well known in the art, a cylindrical lithium secondary battery generally includes an anode made of carbon materials and a cathode made of lithium oxide, wherein the anode is capable of occluding and emitting lithium ions, a separator bridging the anode and the cathode and preventing the anode and the cathode from coming into electrical contact and a non-aqueous electrolyte. For example, such a cylindrical lithium secondary battery is manufactured by mounting a jelly-roll type electrode assembly having a cathode, an anode and a separator into a metal can, welding the anode of the electrode assembly to a lower end of the can, then injecting a non-aqueous electrolyte into the can, and finally welding the cathode of the electrode assembly to a protruded terminal of a top cap so as to seal the battery.

Such a cylindrical lithium secondary battery has a large capacity, so it should be treated safely and carefully. To this end, a CID (Current Interrupt Device) is applied to the cylindrical lithium secondary battery so as to interrupt the electric current and lower the inner pressure when the battery operates abnormally.

FIGS. 1a to 1c show a conventional operation process of the CID subsequently.

Referring to FIGS. 1a to 1c, a top cap 10 has a cathode terminal in a protruded shape, and an exhaust hole is perforated therein. A PTC (Positive Temperature Coefficient) element 20 is provided below the top cap 10 to intercept an electric current by increasing a battery resistance greatly when a temperature inside the battery is increased. A safety belt 30 is protruded downward in a normal state, but it is protruded upward and ruptured to exhaust gas when an inner pressure of the battery is increased. A connection plate 50 is coupled with the safety belt 30 at one upper side and connected to the cathode of an electrode assembly 40 at one lower side. The top cap 10, the PTC element 20, the safety belt 30 and the connection plate 50 are positioned in order.

Thus, under normal operation condition, the cathode of the electrode assembly 40 is electrically connected to the top cap 10 via a lead 42, the connection plate 50, the safety belt 30 and the PTC element 20.

However, if gas is generated from the electrode assembly 40 and an inner pressure is increased due to a factor such as overcharging, the safety belt 30 inverts its shape to protrude upward as shown in FIG. 1b, and at this time the safety belt 30 is separated from the connection plate 50 to interrupt the electric current so that any overcharging is not continued and the safety of the battery is secured. Nevertheless, if the inner pressure keeps increased, the safety belt 30 is ruptured as shown in FIG. 1c, and the pressurized gas is exhausted through the exhaust hole of the top cap 10 via the ruptured portion, thereby preventing explosion of the battery.

Meanwhile, a device such as notebook to which a cylindrical battery is applied may be exposed to various environments. For example, a user may leave such a device at a high temperature for a long time in a fully-charged state. In this case, though the safety of the battery is ensured, a CID may be activated at an early state due to a temporary increase of inner pressure.

In order to solve this problem, there has been suggested a method of controlling the amount of electrolyte injected into the cylindrical secondary battery or controlling the CID circuit breaker. However, this method deteriorates the safety of the battery. That is to say, it is not easy to solve the safety problems of the battery both regarding over-charging and exposure to a high-temperature environment.

DISCLOSURE OF INVENTION

Technical Problem

The present invention is designed to solve the problems of the prior art, and therefore it is an object of the present invention to provide a cylindrical lithium secondary battery, which ensures the safety of the battery with respect to over-charging and also prevents a CID (Current Interrupt Device) from being activated too early when the battery is used in a high-temperature environment.

Technical Solution

In order to accomplish the above object, the present invention provides a cylindrical lithium secondary battery, which includes an anode and a cathode, capable of occluding or emitting lithium ions; a non-aqueous electrolyte; and a CID (Current Interrupt Device) for intercepting an electric current and lowering inner pressure when the inner pressure of the secondary battery is increased, wherein the CID has an activating pressure in the range from 5 to 20 $Kgf/cm^2$. If the secondary battery is kept at a constant temperature of 75° C. in a fully-charged state, any short circuit occurs after 600 hours or more. If the secondary battery is overcharged in a constant current/constant voltage manner at 10V/1C, any short circuit occurs at 2 hours or less. The non-aqueous electrolyte is a non-linear carbonate-based non-aqueous electrolyte, which includes: a lithium salt; and a non-linear carbonate-based solvent in which (a) a cyclic carbonate compound and (b) a linear ester compound, such as a propionate-based ester compound, selected from the group consisting of ethyl propionate-based compound, methyl butyrate, and propyl acetate, or their mixtures are mixed.

In addition, in the cylindrical lithium secondary battery according to the present invention, a volume ratio (a:b) of the component (a), namely the cyclic carbonate compound, and the component (b), namely the linear ester compound, is in the range from about 1:9 to about 9:1.

In the cylindrical lithium secondary battery according to the present invention, the cyclic carbonate compound may include any one material or a mixture of at least two materials selected from the group consisting of ethylene carbonate, propylene carbonate, fluoroethylene carbonate, and butylene carbonate. Also, the ethyl propionate-based compound may include any one material or a mixture of at least two materials selected from the group consisting of ethyl propionate, ethyl 3-fluoropropanoate, ethyl 3,3-difluoropropanoate, ethyl 3,3,3-trifluoropropanoate, 2-fluoroethyl propionate, 2,2-difluoroethyl propionate, 2,2,2-trifluoroethyl propionate, 2,2,2-trifluoroethyl 3-fluoropropanoate, 2,2,2-trifluoroethyl 3,3-difluoropropanoate, and 2,2,2-trifluoroethyl 3,3,3-trifluoropropanoate.

MODE FOR THE INVENTION

Figure 1:
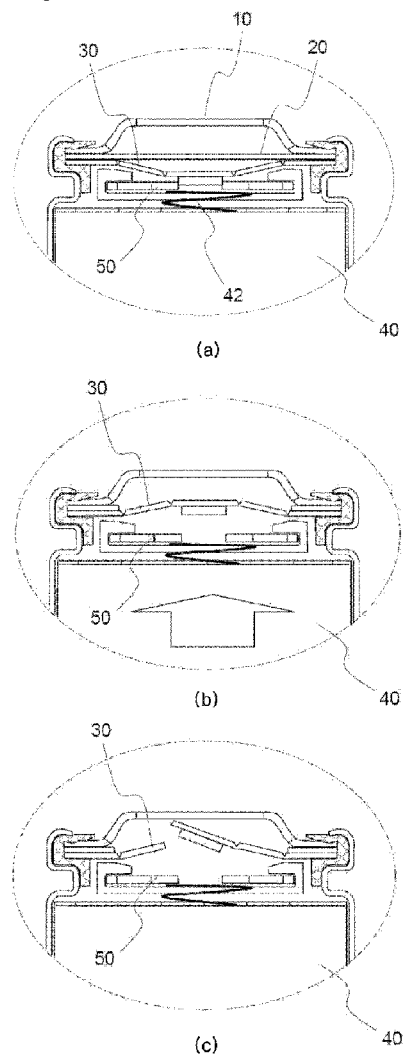
FIGS. 1a to 1c are vertical sectional views showing the process that an electric current is interrupted due to the operation of a CID in a common cylindrical secondary battery and also a high-pressure gas is discharged.
Figure 2:
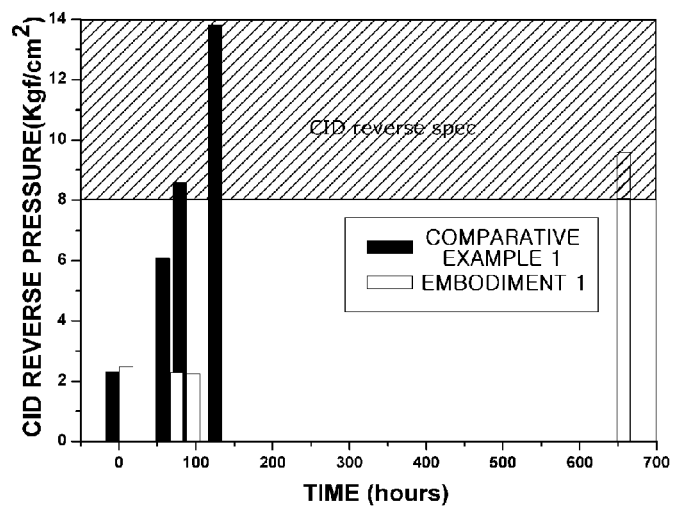
FIG. 2 is a graph showing measurement results of inner pressure, measured after a battery having a changed constant-temperature storage time is taken out and cooled at a normal temperature and then discharged at constant current.
Figure 3:
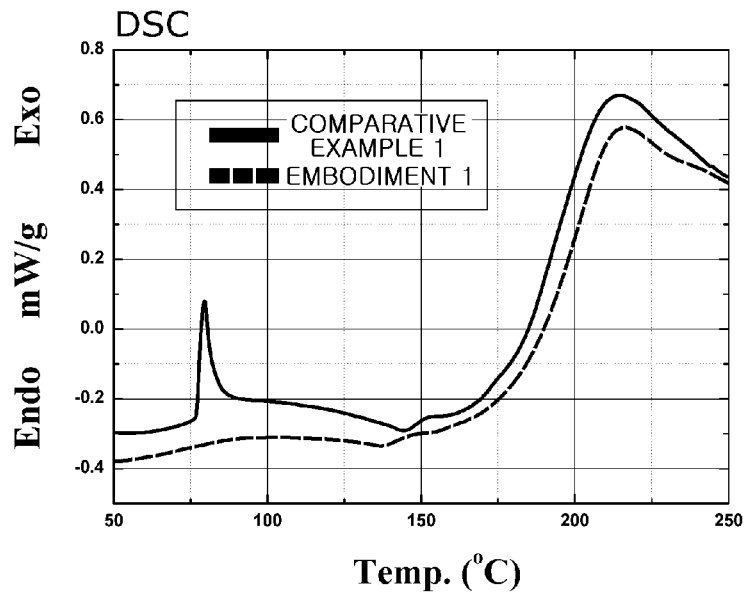
FIG. 3 is a DSC graph showing measurement results, measured by separating a cathode from each battery according to an Embodiment 1 and a Comparative Example 1.

Hereinafter, preferred embodiments of the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

A cylindrical lithium secondary battery according to the present invention includes an anode and a cathode, capable of occluding or emitting lithium ions; a non-aqueous electrolyte; and a CID (Current Interrupt Device) for intercepting electric current and lowering inner pressure when the inner pressure of the secondary battery is increased, wherein an activating pressure of the CID is controlled in the range from 5 to 20 Kgf/cm². If the secondary battery is kept at a constant temperature of 75° C. in a fully-charged state, any short circuit of the battery (CID's activation) occurs after 600 hours or more. If the secondary battery is overcharged in a constant current/constant voltage manner of 10V/1C, any short circuit occurs at 2 hours or less.

The cylindrical lithium secondary battery having the CID falling within the above range may ensure the safety of the secondary battery with respect to overcharging and at the same time prevents the problem that the CID is activated too early and thus the secondary battery stops its operation too early when the secondary battery is used in a high-temperature environment.

In the cylindrical lithium secondary battery of the present invention, if the activating pressure of the CID is less than 5 Kgf/cm², the CID breaks the circuit too early when inner pressure of the secondary battery is increased, so the secondary battery may be used in an unstable state. If the activating pressure of the CID exceeds 20 Kgf/cm², a short circuit of the battery against increased inner pressure may occur too late even under an excessive condition such as overcharging, so it is impossible to ensure the safety of the secondary battery. The activating pressure of the CID is more preferably in the range from 10 to 15 Kgf/cm².

In addition, in the cylindrical lithium secondary battery, when the secondary battery is kept at a constant temperature of 75° C. in a fully-charged state, if the CID is activated before 600 hours, the CID may more probably break the circuit early in a high-temperature environment and thus the secondary battery may stop its operation too early. Also, when the secondary battery is overcharged in a constant current/constant voltage manner of 10V/1C, if the CID causes a short circuit at more than 2 hours, the CID may be short-circuited too late, which may deteriorate the safety of the secondary battery. More preferably, the CID is activated after 670 hours or more when the secondary battery is kept at a constant temperature of 75° C. in a fully-charged state. The CID more preferably is activated at 1.6 hours or less when the secondary battery is overcharged in a constant current/constant voltage manner at 10V/1C.

Meanwhile, the non-aqueous electrolyte injected to an electrode assembly according to the present invention is a non-linear carbonate-based non-aqueous electrolyte, which includes a lithium salt; and a non-linear carbonate-based solvent in which (a) a cyclic carbonate compound and (b) a linear ester compound such as propionate-based ester, methyl butyrate, propyl acetate, and their mixtures are mixed.

The propionate-based ester used in the present invention may be expressed by the following Chemistry Figure 1:

Chemistry FIG. 1

[Chem. 1]

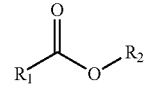

where $R_1$ and $R_2$ are independently a linear or branched $C_{1-6}$ alkyl group, and $R_1$ and $R_2$ may be unsubstituted or substituted with at least one halogen, respectively.

Non-limiting examples of the propionate-based ester compound expressed by the Chemistry Figure 1 include at least one compound selected from the group consisting of methyl propionate-based compound, ethyl propionate-based compound, propyl propionate-based compound, and butyl propionate-based compound. Ethyl propionate-based ester compound is preferred.

A volume ratio (a:b) of the component (a), namely the cyclic carbonate compound, and the component (b), namely the linear ester compound, is preferably in the range from about 1:9 to about 9:1, more preferably from about 2:8 to about 4:6.

The cyclic carbonate compound easily dissociates lithium salts in an electrolyte and thus attributes to the improvement of charge/discharge capacities of the battery. The carbonate compound may employ ethylene carbonate, propylene carbonate, fluoroethylene carbonate and butylene carbonate alone or in combination, but it is not limited thereto. In particular, an ethylene carbonate (or fluoroethylene carbonate) or a mixture of ethylene carbonate (or, fluoroethylene carbonate) and propylene carbonate may more easily dissociate a lithium salt in an electrolyte due to high dielectric constants.

The ethyl propionate-based compound, the methyl butyrate and the propyl acetate are linear ester compounds, which have a low freezing point and a relatively high boiling point and exhibit excellent low-temperature characteristics. In addition, the linear ester compounds have a relatively low reactivity with respect to an anode made of carbon material. Such a linear ester compound is mixed with the aforementioned cyclic carbonate compound to particularly attribute to the improvement of high-rate discharging characteristics of a battery. That is to say, the linear ester compound exhibits high ionic conductivity at normal and low temperatures by suitably coordinating lithium ions, thereby improving high-rate discharging characteristics of a battery. In addition, when a battery is charged, the linear ester compound increases resistance against decomposition reaction of electrolyte at a cathode, thereby restraining a swelling phenomenon of the battery and extending the life cycle of the battery. Moreover, since wettability to an electrode is improved as compared to the case that only an ester carbonate-based solvent is used as a non-aqueous electrolyte, formation of lithium dendrites on an electrode surface is restrained, thereby improving the safety of the battery. These linear ester compounds may be used alone or in combination. The ethyl propionate-based compound may employ any one material or a mixture of at least two materials selected from the group consisting of ethyl propionate, ethyl 3-fluoropropanoate, ethyl 3,3-difluoropropanoate, ethyl 3,3,3-trifluoropropanoate, 2-fluoroethyl propionate, 2,2-difluoroethyl propionate, 2,2,2-trifluoroethyl propionate, 2,2,2-trifluoroethyl 3-fluoropropanoate, 2,2,2-trifluoroethyl 3,3-difluoropropanoate, and 2,2,2-trifluoroethyl 3,3,3-trifluoropropanoate, but it is not limited thereto.

As mentioned above, when the non-aqueous electrolyte having the above composition is used, the fabrication of a cylindrical lithium secondary battery having the features of the present invention may be easily realized.

In the cylindrical lithium secondary battery of the present invention, the lithium salt may be any lithium salts commonly used as an electrolyte of the non-aqueous electrolyte solution. Non-limiting examples of the lithium salt may include $LiPF_6$, $LiBF_4$, $LiSbF_6$, $LiAsF_6$, $LiClO_4$, $LiN(C_2F_5SO_2)_2$, $LiN(CF_3SO_2)_2$, $CF_3SO_3Li$, and $LiC(CF_3SO_2)_3$, but it is not limited thereto. In addition, other compounds such as a lactone, ether, ester, acetonitrile, lactam, and ketone may be added to the non-aqueous electrolyte without departing from the purpose of the present invention.

The cylindrical lithium secondary battery of the present invention has a conventional structure. For example, the cylindrical lithium secondary battery includes an anode made of carbon material and a cathode made of lithium-containing oxide, which anode carbon material is capable of occluding or emitting lithium ions, and a separator may be interposed between the cathode and the anode.

The carbon material capable of occluding or emitting lithium ions may be low-crystalline carbon or high-crystalline carbon, but it is not limited thereto. The low-crystalline carbon includes soft carbon or hard carbon, and the high-crystalline carbon includes natural graphite, Kish graphite, pyrolytic carbon, mesophase pitch based carbon fiber, mesocarbon microbeads, mesophase pitches, and high-temperature sintered carbon such as petroleum or coal tar pitch derived cokes, but it is not limited thereto. At this time, the anode may have a binding agent, which may use various kinds of binder polymer such as PVDF-co-HFP (polyvinylidene-co-hexafluoropropylene), polyvinylidenefluoride, polyacrylonitrile, polymethylmethacrylate, SBR (Styrene-Butadiene Rubber) copolymer, and modified SBR copolymer.

In addition, the lithium-containing oxide capable of occluding or emitting a lithium ion preferably employs a lithium-containing transition metal oxide, for example any one material or a mixture of at least two materials selected from the group consisting of $LiCoO_2$, $LiNiO_2$, $LiMnO_2$, $LiMn_2O_4$, $Li(Ni_aCo_bMn_c)O_2$ (0<a<1, 0<b<1, 0<c<1, a+b+c=1), $LiNi_{1-y}Co_yO_2$, $LiCO_{1-y}Mn_yO_2$, $LiNi_{1-y}Mn_yO_2$ (0≤y<1), $Li(Ni_aCo_bMn_c)O_4$ (0<a<2, 0<b<2, 0<c<2, a+b+c=2), $LiMn_{2-z}Ni_zO_4$, $LiMn_{2-z}Co_zO_4$ (0<z<2), $LiCoPO_4$ and $LiFePO_4$.

The electrode of the cylindrical lithium secondary battery according to the present invention may be manufactured according to a conventional method, for example, which includes adding electrode active material particles and a binder polymer, together with a conductive material and dispersing agent (if required), to a solvent to make a slurry, then coating a current collector with the slurry, and finally compressing and drying it. In addition, the separator may employ common porous polymer films used as a conventional separator, such as porous polymer film made using an ethylene homopolymer, propylene homopolymer, ethylene/butene copolymer, ethylene/hexene copolymer or ethylene/methacrylate copolymer, in a single layer or in laminate form. In other cases, the separator may use a common porous non-woven fabric such as a non-woven fabric made of glass fiber with a high melt point or polyethylene terephthalate fiber, but it is not limited thereto.

In addition, the assembly of the cathode and the anode may be received in a metal can that configures an appearance of the secondary battery, and the CID having the aforementioned circuit breaking function may be made in a common method.

Hereinafter, the present invention is explained in more detail using the Embodiments. However, the following Embodiments may be modified in various ways, and the present invention should not be interpreted as being limited thereto. The following Embodiments are just given for persons having ordinary skill in the art to understand the present invention in a better way.

Comparative Example 1

1 M $LiPF_6$ was added to a solvent in which a fluoroethylene carbonate (FEC), ethylene carbonate (EC), propylene carbonate (PC), dimethyl carbonate (DMC) and ethylmethyl carbonate (EMC) are mixed at a weight ratio of 5:15:10:70:5 to prepare a non-aqueous electrolyte. A polyolefin porous film was interposed between a cathode using $LiCoO_2$ as a cathode active material and an anode using artificial graphite as an anode active material to fabricate a jelly-roll type electrode assembly. Then the electrode assembly was received in a metal can. After that, the metal can was sealed in a common way, and the above non-aqueous electrolyte was injected therein. In addition, a conventional CID (Current Interrupt Device) as shown in FIG. 1 was mounted thereto. The CID had an activating pressure of 8 to 14 $Kgf/cm^2$.

Comparative Example 2

The Comparative Example 2 is substantially identical to the Comparative Example 1, except that the electrolyte used a solvent in which FEC, PC and DMC was mixed at a weight ratio of 2:1:7.

Embodiment 1

The Embodiment 1 is substantially identical to the Comparative Example 1, except that the electrolyte used a solvent in which FEC, EC, PC and EP was mixed at a weight ratio of 5:15:10:75.

Embodiment 2

The Embodiment 2 is substantially identical to the Comparative Example 1, except that the electrolyte used a solvent in which FEC, PC and EP was mixed at a weight ratio of 2:1:7.

Measurement of CID Activation Time at Constant Temperature Storage at 75° C. in Fully-Charged State Four cylindrical batteries were prepared respectively according to the Comparative Examples 1 and 2 and the Embodiments 1 and 2. After electrolyte was injected into the cylindrical batteries, the batteries were aged at a normal temperature for 1.5 days and then charged for 50 minutes at a 0.2 C-rate, thereby completing a fabrication process. After that, the batteries were prepared into a shipment charging state through an activating process. The batteries were respectively charged to 4.35V at a 0.8 C-rate under a constant current/constant voltage condition, and then fully charged with setting a cut-off condition to 50 mA. The fully-charged cylindrical batteries were put into a high-temperature chamber of 75° C., and then voltage change over time was observed. The observation results are shown in the following Tables 1 and 2.

TABLE 1

|  |  | Preservation time in 75° C. constant-temperature chamber | | | | | | | |
|---|---|---|---|---|---|---|---|---|---|
|  | No | 114 | 138 | 242 | 354 | 425 | 673 | 763 |
| Comparative Example 1 | #1 | 4.18 | X | | | | | |
|  | #2 | 4.18 | X | | | | | |
|  | #3 | x | | | | | | |
|  | #4 | 4.17 | X | | | | | |
| Embodiment 1 | #1 | 4.20 | 4.19 | 4.15 | 4.13 | 4.11 | 4.07 | x |
|  | #2 | 4.19 | 4.18 | 4.15 | 4.12 | 4.11 | 4.07 | x |
|  | #3 | 4.19 | 4.18 | 4.15 | 4.12 | 4.11 | 4.07 | 4.06 |
|  | #4 | 4.19 | 4.18 | 4.15 | 4.12 | 4.11 | 4.07 | 4.06 |

TABLE 2

|  |  | Preservation time in 75° C. constant-temperature chamber | | | | | | |
|---|---|---|---|---|---|---|---|---|
|  | No | 119 | 143 | 255 | 389 | 485 | 599 | 1021 |
| Comparative Example 2 | #1 | 4.18 | X | | | | | |
|  | #2 | 4.18 | X | | | | | |
|  | #3 | 4.18 | X | | | | | |
|  | #4 | 4.18 | X | | | | | |
| Embodiment 2 | #1 | 4.18 | 4.17 | 4.14 | 4.11 | 4.09 | 4.07 | 4.00 |
|  | #2 | 4.19 | 4.18 | 4.15 | 4.12 | 4.10 | 4.08 | 4.01 |
|  | #3 | 4.19 | 4.18 | 4.15 | 4.12 | 4.10 | 4.08 | 4.01 |
|  | #4 | 4.18 | 4.18 | 4.14 | 4.11 | 4.09 | 4.07 | 4.00 |

As seen from the Tables 1 and 2, in the Comparative Examples 1 and 2, the CID broke the circuit (was activated) in 100 to 150 hours when the batteries were stored at 75° C. in a fully-charged state. However, in the Embodiments 1 and 2, though the batteries were stored for a long time over 600 hours, the CID did not break the circuit, but just a general voltage drop was observed.

At a certain point of time, among the batteries having experienced the above constant-temperature preservation measurement, the batteries according to the Comparative Example 1 and the Embodiment 2 were taken out and cooled at a normal temperature, and then they were discharged to 3V at a 0.5 C-rate in a constant-current condition. Using gas analysis equipment, gas generated in the discharged batteries was quantitatively and qualitatively measured. The measured values are converted into inner pressure values and then shown in the following Table 3. The unit of inner pressure is Kgf/cm$^2$.

TABLE 3

| 75° C. Storage time (hours) | Comparative Example 1 | Embodiment 1 |
|---|---|---|
| 0 | 2.31 | 2.48 |
| 66 | 6.07 | 2.30 |
| 88 | 8.59 | 2.25 |
| 134 | 13.83 | not measured |
| 648 | no data | 9.59 |

When the battery of the Comparative Example 1 was stored for 134 hours, the CID was already activated, and an inner pressure converted based on the gas analysis result was 13.83. This result is close to a maximum value of the activation specification range of the CID used in the assembling process. However, the CID was not activated though the battery of the Embodiment 1 was stored over 600 hours, and an inner pressure converted through gas analysis after 648 hours was about 9.59. This result is also within the CID activation specification range, but the CID seems to be not activated since the inner pressure does not reach a substantial activation pressure in the specification range.

It would be understood that an inner pressure is increased rapidly while the battery using the electrolyte of the Comparative Example 1 is stored at a high temperature. However, gas generation occurs slowly and thus an inner pressure is slowly increased while the battery of the Embodiment 1 is stored at a high temperature. It may also explain the following facts: when cathodes are separated from the batteries of the Comparative Example 1 and the Embodiment 1 and then photographed using DSC, the battery of the Comparative Example 1 exhibits a clear exothermic peak below 100° C. while there is no peak in the cathode DSC of the battery of the Embodiment 1. The peak is generally shown due to the reaction between an electrolyte and cathode interface active material at a temperature of 100° C. or below. However, since there is no peak, it would be understood that the electrolyte composition of the Embodiment 1 is very stable. The cathode DSC results are shown in the Table 3.

Measurement of CID Short-Circuit Time with Respect to Overcharging

Overcharging experiments were conducted on the batteries respectively manufactured according to the Comparative Examples 1 and 2 and the Embodiments 1 and 2 in a 10V/1C constant-current/constant-voltage manner, and then the time required to activate the CID to break the circuit and the time required to activate the CID under different temperatures were measured. The measurement results are shown in the following Table 4.

TABLE 4

| | CID activation time (min) | CID activation temperature (° C.) |
|---|---|---|
| Comparative Example 1 | 90.1 | 67.4 |
| Embodiment 1 | 91.0 | 60.8 |
| Comparative Example 2 | 91.0 | 73.0 |
| Embodiment 2 | 90.6 | 58.3 |

Figure 4:
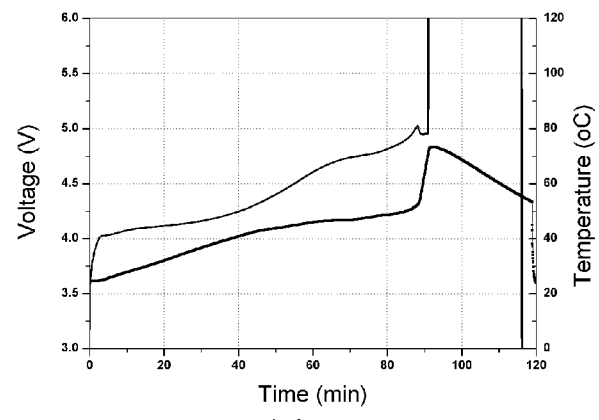
FIGS. 4a and 4b are graphs showing measurement results of CID activation time and battery temperature, measured when batteries according to an Embodiment 2 and a Comparative Example 2 are overcharged.
Figure 4:
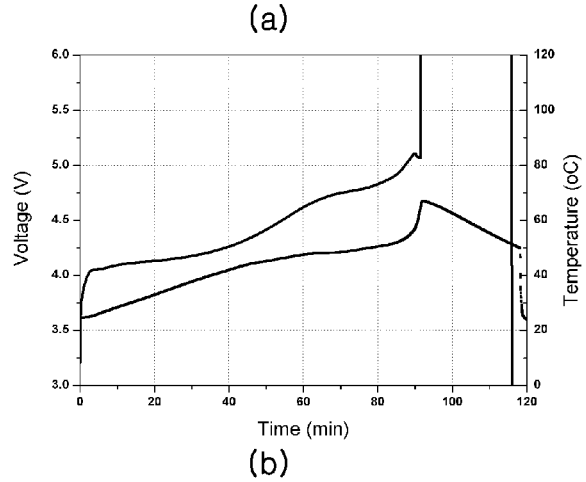

Meanwhile, FIGS. 4a and 4b illustrate graphs obtained from the above overcharging experiments for the batteries according to the Embodiment 2 and the Comparative Example 2.

Referring to FIGS. 4a and 4b, it would be found that the battery of the Embodiment 2 exhibited improved safety rather than the battery of the Comparative Example 2. Both batteries of the Embodiment 2 and the Comparative Example 2 passed the insulation-overcharging test. However, when the CID was activated and broke the circuit, the temperature of the battery of the Embodiment 2 was lower than that of the Comparative Example 2.

INDUSTRIAL APPLICABILITY

The cylindrical lithium secondary battery of the present invention ensures the safety of the battery at overcharging and also at the same time prevent the CID from being activated too early, such that the battery stops its operation when the battery is used in a high-temperature environment.

In particular, the cylindrical lithium secondary battery employing a non-linear carbonate-based non-aqueous electrolyte with a predetermined composition may restrain the increase of inner pressure since a small amount of gas is generated at a high temperature, and the cylindrical lithium secondary battery of the present invention shows excellent effects in ensuring the safety of the battery with respect to over-charging and in preventing the CID from being activated too early in a high-temperature environment.

The invention claimed is:

1. A cylindrical lithium secondary battery, comprising:
an anode and a cathode;
a non-aqueous electrolyte; and
a CID (Current Interruptive Device) for intercepting electric current and lowering inner pressure when the inner pressure of the secondary battery is increased,
wherein the CID has an activating pressure in the range from 5 to 20 Kgf/cm$^2$,
wherein, if t he secondary battery is kept at a constant temperature of 75° C. in a fully-charged state, any short circuit occurs after 600 hours or more,
wherein, if the secondary battery is overcharged in a constant current/constant voltage manner at 10V/1C, any short circuit occurs at 2 hours or less, and
wherein the non-aqueous electrolyte is a non-linear carbonate-based non-aqueous electrolyte, which includes:
a lithium salt; and
a non-linear carbonate-based solvent consisting of (a) a cyclic carbonate compound and (b) a linear ester compound selected from the group consisting of propionate-based compound, methyl butyrate, propyl acetate, and mixtures thereof.

2. The cylindrical lithium secondary battery according to claim 1, wherein the CID has an activating pressure in the range from 10 to 15 Kgf/cm$^2$.

3. The cylindrical lithium secondary battery according to claim 1, wherein the CID) is activated after 670 hours or more when the secondary battery is kept at a constant temperature of 75° C. in a fully-charged state, and
wherein the CID) is activated at 1.6 hours or less when the secondary battery is overcharged in a constant current/constant voltage mariner at 10V/1C.

4. The cylindrical lithium secondary battery according to claim 1, wherein a volume ratio (a:b) of the component (a) and the component (b) is in the range from about 1:9 to about 9:1.

5. The cylindrical lithium secondary battery according to claim 1, wherein the cyclic carbonate compound includes any one material or a mixture of at least two materials selected from the group consisting of ethylene carbonate, propylene carbonate, fluoroethylene carbonate, and butylene carbonate.

6. The cylindrical lithium secondary battery according to claim 1, wherein the propionate -based ester used in the present invention may be expressed by the following Chemical Formula 1:

Chemical Formula 1

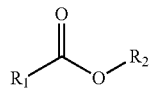

where R$_1$ and R$_2$ are independently a linear or branched C$_{1-6}$ alkyl group, and R$_1$ and R$_2$ may be unsubstituted or substituted with at least one halogen, respectively.

7. The cylindrical lithium secondary battery according to claim 6, wherein the propionate-based ester compound expressed by the Chemical Formula 1 includes at least one compound selected from the group consisting of methyl propionate-based compound, ethyl propionate-based compound, propyl propionate-based compound, and butyl propionate-based compound.

8. The cylindrical lithium secondary battery according to claim 7, wherein the ethyl propionate-based compound includes any one material or a mixture of at least two materials selected from the group consisting of ethyl propionate, ethyl 3-fluoropropanoate, ethyl 3,3-difluoropropanoate, ethyl 3,3,3-trifluoropropanoate, 2-fluoroethyl propionate, 2,2-difluoroethyl propionate, 2,2,2-trifluoroethyl propionate, 2,2,2-trifluoroethyl 3-fluoropropanoate, 2,2,2-trifluoroethyl 3,3-difluoropropanoate, and 2,2,2-trifluoroethyl 3,3,3-trifluoropropanoate.

9. The cylindrical lithium secondary battery according to claim 1,
wherein the lithium salt includes any one material or a mixture of at least two materials selected from the group consisting of LiPF$_6$, LiBF$_4$, LiSbF$_6$, LiAsF$_6$, LiClO$_4$, LiN(C$_2$F$_5$SO$_2$)$_2$, LiN(CF$_3$SO$_2$)$_2$, CF$_3$SO$_3$Li and LiC(CF$_3$SO$_2$)$_3$.

10. The cylindrical lithium secondary battery according to claim 1, wherein the anode is made of carbon material capable of occluding or emitting lithium ions.

11. The cylindrical lithium secondary battery according to claim 1, wherein the cathode is made of lithium-containing oxide.

12. A cylindrical lithium secondary battery, comprising :
an anode and a cathode,
a non-aqueous electrolyte; and
a CID (Current Interruptive Device) for intercepting electric current and lowering inner pressure when the inner pressure of the secondary battery is increased,
wherein the CID has an activating pressure in the range from 10 to 15 Kgf/cm$^2$, wherein if the secondary battery is kept at a constant temperature of 75'C in a fully-charging state, the CID is activated after 670 hours or more, wherein if the secondary battery is overcharged in a constant current/constant voltage manner at 10V/1C, the CID is activated at 1.6 hours or less, and wherein the non-aqueous electrolyte comprises an ethyl propionate-based compound.

13. The cylindrical lithium secondary battery according to claim 12, wherein the ethyl propionate-based compound includes any one material or a mixture of at least two materials selected from the group consisting of ethyl propionate, ethyl 3-fluoropropanoate, ethyl 3,3-difluoropropanoate, ethyl 3,3,3-trifluoropropanoate, 2-fluoroethyl propionate, 2,2-difluorocthyl propionate, 2,2,2-trifluoroethyl propionate, 2,2,2-trifluoroethyl 3-fluoropropanoate, 2,2,2-trifluoroethyl 3,3-difluoropropanoate, and 2,2,2-trifluoroethyl 3,3,3-trifluoropropanoate.

14. The cylindrical lithium secondary battery according to claim 1, wherein the non-aqueous electrolyte consists of the non-linear carbonate-based non-aqueous electrolyte.

15. The cylindrical lithium secondary battery according to claim 1, wherein the non-linear carbonate-based solvent consists of (a) a cyclic carbonate compound and (b) a linear ester compound selected from the group consisting of methyl butyrate, propy l acetate, and mixtures thereof.

16. The cylindrical lithium secondary battery according to claim 12, wherein the non-aqueous electrolyte consists of the non-linear carbonate-based non-aqueous electrolyte.

\* \* \* \* \*